(12) United States Patent
Hamakubo

(10) Patent No.: US 11,603,331 B2
(45) Date of Patent: Mar. 14, 2023

(54) OPTICAL FIBER

(71) Applicant: SUMITOMO ELECTRIC INDUSTRIES, LTD., Osaka (JP)

(72) Inventor: Katsushi Hamakubo, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 339 days.

(21) Appl. No.: 16/761,300

(22) PCT Filed: Aug. 21, 2019

(86) PCT No.: PCT/JP2019/032703
§ 371 (c)(1),
(2) Date: May 4, 2020

(87) PCT Pub. No.: WO2020/040223
PCT Pub. Date: Feb. 27, 2020

(65) Prior Publication Data
US 2021/0188705 A1    Jun. 24, 2021

(30) Foreign Application Priority Data

Aug. 22, 2018  (JP) .............................. JP2018-155181

(51) Int. Cl.
*C03C 25/10*   (2018.01)
*C03C 25/1065* (2018.01)
(Continued)

(52) U.S. Cl.
CPC ........ *C03C 25/109* (2013.01); *C03C 25/1065* (2013.01); *C03C 25/285* (2013.01);
(Continued)

(58) Field of Classification Search
CPC .................. C03C 25/109; C03C 25/47; C03C 25/1065; C03C 25/285; C03C 25/42; G02B 6/02395
(Continued)

(56) References Cited

U.S. PATENT DOCUMENTS 4,525,026 A * 6/1985 Elion ....................... H01B 7/28
385/128
4,655,545 A * 4/1987 Yamanishi .......... C03C 25/1065
385/141
(Continued)

FOREIGN PATENT DOCUMENTS

CN    102686528 A    9/2012
CN    107001129 A    8/2017
(Continued)

OTHER PUBLICATIONS

Shiue, J. et al., "Effects of silica nanopaerticle addtion to the secondary coating of dual-cated optical fibers," Acta Materialia, Jun. 2006, vol. 54, Issue 10, p. 2631-p. 2636.

*Primary Examiner* — Jerry M Blevins
(74) *Attorney, Agent, or Firm* — Faegre Drinker Biddle & Reath LLP

(57) ABSTRACT

An optical fiber comprises a glass fiber comprising a core and a cladding, a primary resin layer being in contact with the glass fiber and covering the glass fiber, and a secondary resin layer covering the primary resin layer, wherein the secondary resin layer consists of a cured product of a resin composition comprising a base resin containing a urethane (meth)acrylate oligomer, a monomer, and a photopolymerization initiator and hydrophobic inorganic oxide particles, the content of the inorganic oxide particles is 1% by mass or more and 60% by mass or less based on the total amount of the resin composition, and the glass transition temperature
(Continued)

of the secondary resin layer is 60° C. or more and 120° C. or less.

6 Claims, 1 Drawing Sheet

(51) Int. Cl.
    *C03C 25/47*     (2018.01)
    *C03C 25/285*     (2018.01)
    *C03C 25/42*     (2006.01)
    *G02B 6/02*     (2006.01)

(52) U.S. Cl.
    CPC ............. *C03C 25/42* (2013.01); *C03C 25/47* (2018.01); *G02B 6/02395* (2013.01)

(58) Field of Classification Search
    USPC ........................................................ 385/124
    See application file for complete search history.

(56) References Cited

U.S. PATENT DOCUMENTS

| | | | |
|---|---|---|---|
| 6,304,705 | B1 | 10/2001 | Kalish et al. |
| 2002/0099110 | A1 | 7/2002 | Norlin et al. |
| 2006/0088263 | A1 | 4/2006 | Tanaka et al. |
| 2010/0329617 | A1* | 12/2010 | Bulters ............... C03C 25/1065 522/96 |
| 2011/0274396 | A1* | 11/2011 | Nakajima .......... G02B 6/02395 385/128 |
| 2012/0321265 | A1* | 12/2012 | Terruzzi ............. G02B 6/02395 385/128 |
| 2017/0003446 | A1 | 1/2017 | Homma |
| 2017/0307815 | A1 | 10/2017 | Iwaguchi et al. |
| 2018/0095221 | A1 | 4/2018 | Homma et al. |
| 2018/0128969 | A1 | 5/2018 | Iwaguchi et al. |
| 2018/0128970 | A1 | 5/2018 | Homma et al. |
| 2022/0041501 | A1 | 2/2022 | Hamakubo |

FOREIGN PATENT DOCUMENTS

| | | |
|---|---|---|
| CN | 107406690 A | 11/2017 |
| CN | 107894628 A | 4/2018 |
| CN | 108061933 A | 5/2018 |
| EP | 3 783 409 A1 | 2/2021 |
| JP | H02-69706 A | 3/1990 |
| JP | 2001-066474 A | 3/2001 |
| JP | 2003-277453 A | 10/2003 |
| JP | 2003-315639 A | 11/2003 |
| JP | 2009-510520 A | 3/2009 |
| JP | 2010-511770 A | 4/2010 |
| WO | WO-03/080690 A1 | 10/2003 |
| WO | WO-2007/040947 A1 | 4/2007 |
| WO | WO-2008/069656 A1 | 6/2008 |
| WO | WO-2011/063838 A1 | 6/2011 |
| WO | WO-2020/255818 A1 | 12/2020 |

\* cited by examiner

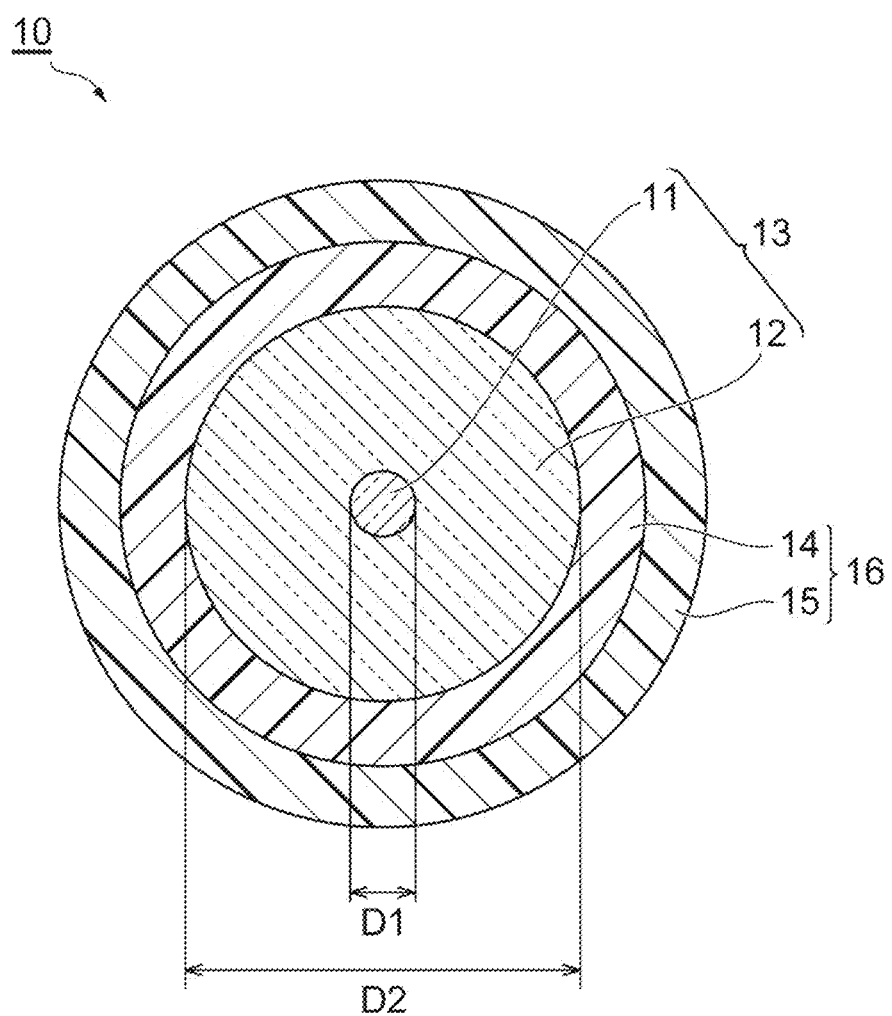

OPTICAL FIBER

TECHNICAL FIELD

The present disclosure relates to an optical fiber.

This application claims priority based on Japanese Patent Application No. 2018-155181 filed on Aug. 22, 2018, and incorporates all the contents described in the Japanese application.

BACKGROUND ART

An optical fibers has generally a coating resin layer for protecting a glass fiber that is an optical transmission medium, and the coating resin layer includes a primary resin layer and a secondary resin layer. In order to reduce an increase in transmission loss induced by micro-bend generated when lateral pressure is applied to the optical fiber, the optical fiber has been required to have excellent lateral pressure characteristics.

For example, in Patent Literature 1, it is investigated to reduce the bending loss of the optical fiber by increasing the Young's modulus of the secondary resin layer (second coating). Patent Literature 2 discloses that in order to prevent residual stress in the coating resin layer from being a cause of transmission loss of the optical fiber, the glass transition temperature of the secondary resin layer is reduced by using a resin composition containing a specific urethane (meth)acrylate.

CITATION LIST

Patent Literature

[Patent Literature 1] JP 2009-510520 A
[Patent Literature 2] JP 2003-277453 A

SUMMARY OF INVENTION

An optical fiber according to an aspect of the present disclosure comprises a glass fiber comprising a core and a cladding, a primary resin layer being in contact with a glass fiber and covering the glass fiber, and a secondary resin layer covering the primary resin layer, wherein the secondary resin layer consists of a cured product of a resin composition comprising a base resin containing a urethane (meth)acrylate oligomer, a monomer, and a photopolymerization initiator, and hydrophobic inorganic oxide particles, the content of the inorganic oxide particles is 1% by mass or more and 60% by mass or less based on the total amount of the resin composition, and the glass transition temperature of the secondary resin layer is 60° C. or more and 120° C. or less.

BRIEF DESCRIPTION OF DRAWING

FIG. 1 is a schematic cross-section diagram showing an example of the optical fiber according to the present embodiment.

DESCRIPTION OF EMBODIMENTS

Problem to be Solved by the Present Disclosure

In order to improve the lateral pressure characteristics, it is important to increase the Young's modulus of the secondary resin layer, but the glass transition temperature of the secondary resin layer becomes high. As a result, the residual stress applied to the primary resin layer is increased, and voids are easily generated in the optical fiber. Therefore, the secondary resin layer is required to suppress the generation of voids in the optical fiber while maintaining the Young's modulus required for improving the lateral pressure characteristics.

An object of the present disclosure is to provide an optical fiber in which the generation of voids is suppressed and the lateral pressure characteristics are excellent.

Effect of the Present Disclosure

The present disclosure can provide an optical fiber in which the generation of voids is suppressed and the lateral pressure characteristics are excellent.

Description of Embodiments of the Present Disclosure

First, the contents of the embodiment of the present disclosure will be described by listing them. An optical fiber according to an aspect of the present disclosure comprises a glass fiber comprising a core and a cladding, a primary resin layer being in contact with a glass fiber and covering the glass fiber, and a secondary resin layer covering the primary resin layer, wherein the secondary resin layer consists of a cured product of a resin composition comprising a base resin containing a urethane (meth)acrylate oligomer, a monomer, and a photopolymerization initiator, and hydrophobic inorganic oxide particles, the content of the inorganic oxide particles is 1% by mass or more and 60% by mass or less based on the total amount of the resin composition, and the glass transition temperature of the secondary resin layer is 60° C. or more and 120° C. or less.

An optical fiber according to an aspect of the present disclosure is an optical fiber comprising a glass fiber comprising a core and a cladding, a primary resin layer being in contact with the above glass fiber and covering the glass fiber, and a secondary resin layer covering the primary resin layer, wherein the secondary resin layer comprises inorganic oxide particles, the content of the inorganic oxide particles is 1% by mass or more and 60% by mass or less based on the total amount of the secondary resin layer, and the glass transition temperature of the secondary resin layer is 60° C. or more and 120° C. or less.

Using a resin composition containing inorganic oxide particles in a specific range can fault a secondary resin layer having a high Young's modulus while keeping the glass transition temperature in a certain range. Thereby, the generation of the voids can be suppressed sufficiently and the lateral pressure characteristics can be improved in the optical fiber.

Due to excellent dispersion properties in the resin composition and easy formation of the resin layer with a high Young's modulus, the inorganic oxide particles may be at least one selected from the group consisting of silicon dioxide, zirconium dioxide, aluminum oxide, magnesium oxide, titanium oxide, tin oxide, and zinc oxide.

Due to formation of a resin layer with a high Young's modulus, the average primary particle size of the inorganic oxide particles may be 500 nm or less.

From the viewpoint of imparting appropriate strength to the coating resin layer, the Young's modulus of the secondary resin layer may be 1150 MPa or more and 2700 MPa or less at 23° C.±2° C.

Detail of Embodiment of the Present Disclosure

Specific examples of a resin composition and an optical fiber according to embodiments of the present disclosure will be described referring to the drawing as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica can be used, for example, in the core 11, and pure silica or fluorine-added silica can be used in the cladding 12.

In FIG. 1, for example, the outside diameter (D2) of the glass fiber 13 is about 125 μM, and the diameter (D1) of the core 11 constituting the glass fiber 13 is about 7 to 15 μm. The thickness of the coating resin layer 16 is typically about 60 to 70 μm. The thickness of each of the primary resin layer 14 and the secondary resin layer 15 may be about 10 to 50 μm, and for example, the thickness of the primary resin layer 14 may be 35 μm and the thickness of the secondary resin layer 15 may be 25 μm. The outside diameter of the optical fiber 10 may be about 245 to 265 μm.

The thickness of the coating resin layer 16 may be about 27 to 48 μm. The thickness of each of the primary resin layer 14 and the secondary resin layer 15 may be about 10 to 38 μm, and for example, the thickness of the primary resin layer 14 may be 25 μm and the thickness of the secondary resin layer 15 may be 10 μm. The outside diameter of the optical fiber 10 may be about 179 to 221 μm.

Furthermore, the outer diameter (D2) of the glass fiber 13 may be about 100 μm, and the thickness of the coating resin layer 16 may be about 22 to 37 μm. The thickness of each of the primary resin layer 14 and the secondary resin layer 15 may be about 5 to 32 μm, and for example, the thickness of the primary resin layer 14 may be 25 μm and the thickness of the secondary resin layer 15 may be 10 μm. The outside diameter of the optical fiber 10 may be about 144 to 174 μm.

(Secondary Resin Layer)

The secondary resin layer 15 can be formed by curing a resin composition comprising a base resin containing a urethane (meth)acrylate oligomer, a monomer, and a photopolymerization initiator and hydrophobic inorganic oxide particles. That is, the secondary resin layer 15 includes a cured product of a resin composition comprising a base resin containing a urethane (meth)acrylate oligomer, a monomer, and a photopolymerization initiator and hydrophobic inorganic oxide particles.

(Meth)acrylate means an acrylate or a methacrylate corresponding to it. The same applies to (meth)acrylic acid and the like.

(Inorganic Oxide Particles)

The inorganic oxide particles according to the present embodiment have a surface subjected to hydrophobic treatment. The hydrophobic treatment according to the present embodiment is introduction of a hydrophobic group onto the surface of the inorganic oxide particles. The inorganic oxide particles having a hydrophobic group introduced have excellent dispersibility in the resin composition. The hydrophobic group may be a reactive group such as a (meth)acryloyl group or a vinyl group, or may be a non-reactive group such as a hydrocarbon group (for example, an alkyl group) or an aryl group (for example, a phenyl group). In the case of the inorganic oxide particles having a reactive group, the resin layer having high Young's modulus is easy to form.

The inorganic oxide particles according to the present embodiment are dispersed in a dispersion medium. Using the inorganic oxide particles dispersed in the dispersion medium allows for uniform dispersion of the inorganic oxide particles in the resin composition and then improvement of the storage stability of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, polytetramethylene glycol di(meth)acrylate, 2-hydroxy-3-phenoxypropyl (meth)acrylate, (meth)acrylic acid adduct of propylene glycol diglycidyl ether, (meth)acrylic acid adduct of tripropylene glycol diglycidyl ether, and (meth)acrylic acid adduct of glycerin diglycidyl ether. As the (meth)acryloyl compound, compounds exemplified by monomers described below may be used.

A ketone solvent such as methyl ethyl ketone (MEK), an alcohol solvent such as methanol (MeOH) or propylene glycol monomethyl ether (PGME), or an ester solvent such as propylene glycol monomethyl ether acetate (PGMEA) may be used as a non-reactive dispersion medium. In the case of the non-reactive dispersion medium, the resin composition may be prepared by mixing the base resin and the inorganic oxide particles dispersed in the dispersion medium and removing a part of the dispersion medium. When the dispersion medium including surface-modified inorganic oxide particles is observed with an electron microscope and no aggregated particles are observed, the surface-modified inorganic oxide particles are dispersed as primary particles.

The inorganic oxide particles dispersed in the dispersion medium remain to be dispersed in the resin layer after curing of the resin composition. When a reactive dispersion medium is used, the inorganic oxide particles are mixed with the dispersion medium in the resin composition and are incorporated in the resin layer with the dispersion condition maintained. When a non-reactive dispersion medium is used, at least a part of the dispersion medium evaporates and disappears from the resin composition, but the inorganic oxide particles remain in the resin composition with the dispersion condition remained and are also present in the cured resin layer with the dispersion condition remained. Electron microscope observation shows that the inorganic oxide particles present in the resin layer are in the condition of dispersion of the primary particle.

Due to excellent dispersion properties in the resin composition and easy formation of tough resin layer, it is preferable that the inorganic oxide particles are at least one selected from the group consisting of silicon dioxide (silica), zirconium dioxide (zirconia), aluminum oxide (alumina), magnesium oxide (magnesia), titanium oxide (titania), tin oxide, and zinc oxide. From the view point of excellent inexpensiveness, easy surface treatment, permeability to ultraviolet ray, easy provision of a resin layer with appropriate hardness, and the like, it is more preferable that the hydrophobic silica particles be used as the inorganic oxide particles according to the present embodiment.

From the viewpoint of imparting appropriate toughness to the secondary resin layer, the average primary particle size of the inorganic oxide particles may be 500 nm or less, is preferably 200 nm or less, more preferably 100 nm or less, and further preferably 50 nm or less. From the viewpoint of increasing the Young's modulus of the secondary resin layer, the average primary particle size of the inorganic oxide particles is preferably 5 nm or more, and more preferably 10 nm or more. The average primary particle diameter can be measured with image analysis of electron microscope pictures, a light scattering method or a BET method, for example. The dispersion medium in which the primary particle of the inorganic oxide particles is dispersed appears to be visually transparent when the diameter of the primary particle is small. When the diameter of the primary particle diameter is relatively large (40 nm or more), the dispersion medium in which the primary particle is dispersed appears to be clouded, but the precipitate is not observed.

The content of the inorganic oxide particles is 1% by mass or more and 60% by mass or less, is preferably 3% by mass or more and 60% by mass or less, and more preferably 5% by mass or more and 50% by mass or less based on the total amount of the resin composition (total amount of the base resin and inorganic oxide particles). The content of the inorganic oxide particles of 1% by mass or more allows easy formation of the resin layer with excellent lateral pressure characteristics. The content of the inorganic oxide particles of 60% by mass or less allows formation of the resin layer having excellent toughness. The total amount of the resin composition and the total amount of the cured product of the resin composition may be considered to be the same. The content of the inorganic oxide particles is 1% by mass or more and 60% by mass or less, is preferably 3% by mass or more and 60% by mass or less, and more preferably 5% by mass or more and 50% by mass or less based on the total amount of the secondary resin layer (the total amount of the cured resin composition constituting the secondary resin layer).

(Base Resin)

A base resin according to the present embodiment contains a urethane (meth)acrylate oligomer, a monomer and a photopolymerization initiator.

As the urethane (meth)acrylate oligomer, an oligomer obtained by reacting a polyol compound, a polyisocyanate compound, and a hydroxyl group-containing (meth)acrylate compound can be used.

Examples of the polyol compound include polytetramethylene glycol, polypropylene glycol and bisphenol A-ethylene oxide addition diol. The number average molecular weight of the polyol compound may be 400 to 1000. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

As a catalyst for synthesizing a urethane (meth)acrylate oligomer, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the view point of easy availability or catalyst performance, it is preferable that dibutyltin dilaurate or dibutyltin diacetate be used as catalyst.

When the urethane (meth)acrylate oligomer is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

As the monomer, a monofunctional monomer having one polymerizable group or a multifunctional monomer having two or more polymerizable groups can be used. A monomer may be used by mixing two or more monomers.

Examples of the monofunctional monomer include (meth)acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl (meth)acrylate, phenoxydiethylene glycol (meth)acrylate, phenoxypolyethylene glycol (meth)acrylate, nonylphenoxypolyethylene glycol (meth)acrylate, 4-tert-butylcyclohexanol (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing (meth)acrylates such as N-acryloyl morpholine, N-vinyl pyrrolidone, N-vinyl caprolactam, N-acryloylpiperidine, N-methacryloylpiperidine, N-acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; N-substituted amide monomers such as (meth)acrylamide, N, N-dimethyl (meth)acrylamide, N, N-diethyl (meth)acrylamide, N-hexyl (meth)acrylamide, N-methyl (meth)acrylamide, N-isopropyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

From the viewpoint of adjusting the Young's modulus, glass transition temperature (Tg), and viscosity of the resin layer, isobornyl (meth)acrylate, 2-phenoxyethyl (meth)acrylate, or 4-tert-butylcyclohexanol (meth)acrylate are preferable as a monofunctional monomer, and it is more preferable that isobornyl (meth)acrylate and 2-phenoxyethyl (meth)acrylate are used in combination.

Examples of the multifunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyl diol di(meth)acrylate, 3-ethyl-1,8-octanediol di(meth)acrylate, EO adduct of bisphenol A di(meth)acrylate, trimethylol propane tri(meth)acrylate, trimethylol octane tri(meth)acrylate, trimethylol propane polyethoxy tri(meth)acrylate, trimethylol propane polypropoxy tri(meth)acrylate, trimethylol propane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylol propane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl]isocyanurate.

From the viewpoint of forming a resin layer having a desired Young's modulus, tripropylene glycol di(meth)acrylate, 1,6-hexanediol di(meth)acrylate, and trimethylolpropane tri(meth)acrylate may be used as a polyfunctional monomer. Among them, tripropylene glycol di(meth)acrylate is preferable as a polyfunctional monomer.

The photopolymerization initiator can be appropriately selected from known radical photopolymerization initiators and used. Examples of the photopolymerization initiator include 1-hydroxycyclohexyl phenyl ketone, 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by 1GM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by 1GM Resins).

Since the Young's modulus of the secondary resin layer becomes easy to adjust, the base resin according to the present embodiment may further contain an epoxy (meth)acrylate oligomer. As an epoxy (meth)acrylate oligomer, an oligomer obtained by reacting a compound having a (meth)acryloyl group with an epoxy resin having two or more glycidyl groups can be used.

The resin composition may further contain a silane coupling agent, a photoacid generator, a leveling agent, an antifoaming agent, an antioxidant, and the like.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

As the photoacid generator, an onium salt having an $A^+B^-$ structure may be used. Examples of the photoacid generator include sulfonium salts such as UVACURE 1590 (manufactured by Daicel-Cytec), CPI-100P, 110P, 210S (manufactured by San-Apro Ltd.) and iodonium salts such as Omnicat 250 (manufactured by IGM Regins), WPI-113 (manufactured by FUJIFILM Wako Pure Chemical Corporation), Rp-2074 (manufactured by Rhodia Japan Ltd.).

Using the resin composition according to the present embodiment for the secondary resin layer, an optical fiber having a high Young's modulus and being excellent in lateral pressure characteristics can be produced.

The Young's modulus of the secondary resin layer is preferably 1150 MPa or more and 2700 MPa or less at 23° C.±2° C., more preferably 1200 MPa or more and 2700 MPa or less, and further preferably 1300 MPa or more and 2500 MPa or less. A Young's modulus of the secondary resin layer of 1150 MPa or more is easy to improve the lateral pressure characteristics of the optical fiber, and the Young's modulus of 2700 MPa or less can provide proper toughness to the secondary resin layer so that crack or the like in the secondary resin layer is hard to occur.

From the viewpoint of reducing residual stress and suppressing the generation of voids, Tg of the secondary resin layer is 60° C. or more and 120° C. or less, preferably 65° C. or more and 115° C. or less, and more preferably 70° C. or more and 110° C. or less.

(Primary Resin Layer)

The primary resin layer 14 can be formed by curing a resin composition including a urethane (meth)acrylate oligomer, a monomer, a photopolymerization initiator and a silane coupling agent. That is, the primary resin layer 14 can include a cured product of the resin composition containing a urethane (meth)acrylate oligomer, a monomer, a photopolymerization initiator, and a silane coupling agent.

Prior art techniques can be used for a resin composition for the primary resin layer. A urethane (meth)acrylate oligomer, a monomer, a photopolymerization initiator and a silane coupling agent may be appropriately selected from compounds exemplified in the above base resin. The resin composition constituting the primary resin layer has composition different from the base resin forming the secondary resin layer.

As a urethane (meth)acrylate oligomer, an oligomer obtained by reacting a polyol compound, a polyisocyanate compound, a hydroxyl group-containing (meth)acrylate compound, and an alcohol may be used.

The Young's modulus of the primary resin layer may be adjusted to a target range depending on the blending ratio of a hydroxyl group-containing (meth)acrylate compound and an alcohol used when synthesizing a urethane (meth)acrylate oligomer. The blending ratio of the alcohol is increased to decrease the oligomer having reactive (meth)acryloyl groups at both ends, easily decreasing the Young's modulus. In addition, the Young's modulus of the primary resin layer 14 may be adjusted to a target range depending on the molecular weight of the polyol compound used when synthesizing the urethane (meth)acrylate oligomer. The number average molecular weight of the polyol compound is preferably 1000 or more and 8000 or less, more preferably 1200 or more and 6500 or less, and further preferably 1500 or more and 6000 or less.

In order to suppress the generation of voids in the optical fiber, the Young's modulus of the primary resin layer is preferably 0.04 MPa or more and 1.0 MPa or less at 23°

C.±2° C., more preferably 0.05 MPa or more and 0.9 MPa or less, and further preferably 0.05 MPa or more and 0.8 MPa or less.

EXAMPLES

Hereinafter, the results of evaluation test using Examples and Comparative Examples according to the present disclosure will be shown, and the present disclosure is described in more detail. The present invention is not limited to these examples.

[Resin Composition for a Secondary Resin Layer]
(Oligomer)

As the oligomer, a urethane acrylate oligomer (UA) obtained by reacting a polypropylene glycol having a molecular weight of 600, 2,4-tolylene diisocyanate, and hydroxyethyl acrylate and an epoxy acrylate oligomer (EA) were prepared.

(Monomer)

As the monomer, isobornyl acrylate (trade name "IBXA" of Osaka Organic Chemical Industry Co., Ltd.), tripropylene glycol diacrylate (trade name "TPGDA" of Daicel Ornex Co., Ltd.), and 2-phenoxyethyl acrylate (trade name "Light Acrylate PO-A" of Kyoei Chemical Co., Ltd.) were prepared.

(Photopolymerization Initiator)

As the photopolymerization initiator, 1-hydroxycyclohexyl phenyl ketone and 2,4,6-trimethylbenzoyldiphenylphosphine oxide were prepared.

(Inorganic Oxide Particles)

As the inorganic oxide particles, hydrophobic silica particles dispersed in MEK, having methacryloyl groups, and with an average primary particle size of 10 to 15 nm were prepared.

(Resin Composition)

First, a base resin was prepared by mixing the above oligomer, monomer, and photopolymerization initiator. Next, the base resin and the silica particles were mixed, and then most of MEK as a dispersion medium was removed under reduced pressure to produce a resin composition for the secondary resin layer. The content of remaining MEK in the resin composition was 5% by mass or less.

In Table 1 and Table 2, the value of the monomer is the content based on the total amount of the base resin, the value of the oligomer is the content based on the total amount of the monomer, oligomer, and silica particles, and the value of silica particles is the content based on the total amount of the resin composition.

[Resin Composition for the Primary Resin Layer]
(Oligomer)

A urethane acrylate oligomer obtained by reacting polypropylene glycol with a molecular weight of 4000, isophorone diisocyanate, hydroxyethyl acrylate, and methanol was prepared.

(Resin Composition)

75 parts by mass of a urethane acrylate oligomer, 12 parts by mass of a nonylphenol EO-modified acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of 3-mercaptopropyltrimethoxysilane were mixed to produce a resin composition for the primary resin layer.

[Production of an Optical Fiber]

On the outer periphery of a 125 μm diameter glass fiber composed of a core and cladding, a primary resin layer with a thickness of 35 μm was formed by using a resin composition for the primary resin layer, and a secondary resin layer was formed on the outer periphery thereof by using a resin composition for the secondary resin layer to produce optical fibers in Examples and Comparative Examples. A linear speed was 1500 m/min.

(Young's Modulus of the Primary Resin Layer)

The Young's modulus of the primary resin layer was measured by the Pullout Modulus (POM) method at 23° C. Two parts of an optical fiber were fixed with two chuck devices, a coating resin layer (the primary resin layer and the secondary resin layer) between the two chuck devices was removed, and then one chuck device was fixed and another chuck device was slowly moved in the opposite direction of the fixed device. When the length of the portion sandwiched between the chuck devices to be moved in the optical fiber is L, the amount of movement of the chuck is Z, the outer diameter of the primary resin layer is Dp, the outer diameter of the glass fiber is Df, the Poisson's ratio of the primary resin layer is n, and the load in moving the chuck device is W, the Young's modulus of the primary resin layer was determined from the following formula. The Young's modulus of the primary resin layer was 0.5 MPa.

$$\text{Young's modulus (MPa)}=((1+n)W/\pi LZ)\times \ln(Dp/Df)$$

(Young's Modulus of the Secondary Resin Layer)

The Young's modulus of the secondary resin layer was determined from 2.5% secant value by using a pipe-shaped coating resin layer (length: 50 mm or more) obtained by taking out a glass fiber from an optical fiber to perform a tensile test (distance between marked lines: 25 mm) in an environment of 23±2° C. and 50±10% RH. The results are shown in Tables 1 and 2.

(Tg of the Secondary Resin Layer)

For measurement of Tg of the secondary resin layer, the dynamic viscoelasticity of a coating resin layer was measured by using a pipe-shaped coating resin layer obtained by taking out a glass fiber from an optical fiber and by using "RSA 3" from TA Instruments, Inc. in the condition of tensile mode (distance between marked lines: 10 mm), a frequency of 11 Hz, a heating rate of 5° C./min, and a temperature range of 30 to 150° C. The peak top temperature of measured tan δ was defined as Tg of the secondary resin layer. The results are shown in Tables 1 and 2.

(Observation of Voids)

An optical fiber of 10 m was stored at 85° C. and 85% humidity for 120 days and then left at −40° C. for 16 hours, and the presence or absence of voids with a diameter of 10 μm or more was observed with a microscope. The case where the number of voids per 1 m of the optical fiber was less than 1 was evaluated as "A", and the case where the number of voids exceeded 1 was evaluated as "C". The results are shown in Tables 1 and 2.

(Lateral Pressure Characteristics)

The transmission loss of light having a wavelength of 1550 nm when the optical fiber 10 was wound into a single layer onto a bobbin with its surface covered with sandpaper and having a diameter of 280 mm was measured by an OTDR (Optical Time Domain Reflectometer) method. In addition, the transmission loss of light having a wavelength of 1550 nm when the optical fiber 10 was wound into a single layer on a bobbin having a diameter of 280 mm without sandpaper was measured by the OTDR method. Difference in the measured transmission loss was obtained and the lateral pressure characteristics was judged to be "OK" when the transmission loss difference was 0.6 dB/km or less, and the lateral pressure characteristics was judged to be "NG" when the transmission loss difference was over 0.6 dB/km. In Comparative Example 6, cracks occurred in the resin layer when the optical fiber was wound around the bobbin, and the lateral pressure characteristics could not be evaluated. The results are shown in Tables 1 and 2.

TABLE 1

| Example | | 1 | 2 | 3 | 4 | 5 | 6 | 7 | 8 |
|---|---|---|---|---|---|---|---|---|---|
| Oligomer | UA | 55 | 47.5 | 45.5 | 41.0 | 35.0 | 30.0 | 20.0 | 17.5 |
| (% by mass) | EA | 14.3 | 14.3 | — | 12.3 | 10.5 | 9.0 | — | 17.5 |
| Monomer (% by mass) | | 25.7 | 33.3 | 45.5 | 28.7 | 24.5 | 21.0 | 20.0 | 35 |
| Silica particles (% by mass) | | 5 | 5 | 5 | 18 | 30 | 40 | 60 | 30 |
| Tg(° C.) | | 70 | 80 | 90 | 80 | 80 | 80 | 85 | 110 |
| Young's modulus (MPa) | | 1200 | 1300 | 1350 | 1600 | 1900 | 2300 | 2700 | 2000 |
| Generation of voids | | A | A | A | A | A | A | A | A |
| Lateral pressure characteristics | | OK | OK | OK | OK | OK | OK | OK | OK |

TABLE 2

| | | Comparative Example | | | | |
|---|---|---|---|---|---|---|
| | | 1 | 2 | 3 | 4 | 5 |
| Oligomer | UA | 60 | 50 | 30 | 17.5 | — |
| (% by mass) | EA | 5 | 15 | 33 | — | 45.5 |
| Monomer (% by mass) | | 35 | 35 | 35 | 17.5 | 45.5 |
| Silica particles (% by mass) | | — | — | — | 65 | 5 |
| Tg(° C.) | | 65 | 79 | 115 | 85 | 120 |
| Young's modulus (MPa) | | 1100 | 1100 | 1600 | 2750 | 1800 |
| Generation of voids | | A | A | C | — | C |
| Lateral pressure characteristics | | NG | NG | OK | — | OK |

REFERENCE SIGNS LIST

10: Optical fiber, 11: Core, 12: Cladding, 13: Glass fiber, 14: Primary resin layer, 15: Secondary resin layer, 16: Coating resin layer.

The invention claimed is:

1. An optical fiber comprising a glass fiber comprising a core and a cladding; a primary resin layer being in contact with the glass fiber and covering the glass fiber; and a secondary resin layer covering the primary resin layer, wherein the secondary resin layer consists of a cured product of a resin composition comprising a base resin containing a urethane (meth)acrylate oligomer, a monomer, and a photopolymerization initiator; and hydrophobic inorganic oxide particles, wherein a content of the inorganic oxide particles consisting of silicon dioxide is 5% by mass or more and 60% by mass or less based on the total amount of the resin composition, a glass transition temperature of the secondary resin layer is 60° C. or more and 120° C. or less, and an average primary particle diameter of the inorganic oxide particles is 200 nm or less.

2. The optical fiber according to claim 1, wherein the average primary particle diameter of the inorganic oxide particles is 100 nm or less.

3. The optical fiber according to claim 1, wherein a Young's modulus of the secondary resin layer is 1150 MPa or more and 2700 MPa or less at 23° C.±2° C.

4. An optical fiber comprising:

a glass fiber comprising a core and a cladding;

a primary resin layer being in contact with the glass fiber and covering the glass fiber; and a secondary resin layer covering the primary resin layer, wherein the secondary resin layer comprises inorganic oxide particles and a content of the inorganic oxide particles consisting of silicon dioxide is 5% by mass or more and 60% by mass or less based on the total amount of the secondary resin layer, a glass transition temperature of the secondary resin layer is 60° C. or more and 120° C. or less, and an average primary particle diameter of the inorganic oxide particles is 200 nm or less.

5. The optical fiber according to claim 4, wherein the average primary particle size of the inorganic oxide particles is 100 nm or less.

6. The optical fiber according to claim 4, wherein a Young's modulus of the secondary resin layer is 1150 MPa or more and 2700 MPa or less at 23° C.±2° C.

* * * * *